(12) United States Patent
Manolakos et al.

(10) Patent No.: US 11,032,044 B2
(45) Date of Patent: Jun. 8, 2021

(54) POSITIONING REFERENCE SIGNAL TRANSMISSION WITH CONTROLLED TRANSMISSION POWER AND BANDWIDTH

(71) Applicant: QUALCOMM Incorporated, San Diego, CA (US)

(72) Inventors: Alexandros Manolakos, San Diego, CA (US); Bilal Sadiq, Basking Ridge, NJ (US); Joseph Binamira Soriaga, San Diego, CA (US); Muhammad Nazmul Islam, Littleton, MA (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/438,169

(22) Filed: Jun. 11, 2019

(65) Prior Publication Data
US 2020/0007288 A1    Jan. 2, 2020

(30) Foreign Application Priority Data
Jun. 29, 2018   (GR) .............................. 20180100296

(51) Int. Cl.
*H04L 5/00*   (2006.01)
*H04W 24/10*   (2009.01)

(52) U.S. Cl.
CPC .......... *H04L 5/0048* (2013.01); *H04L 5/0057* (2013.01); *H04W 24/10* (2013.01)

(58) Field of Classification Search
CPC ... H04L 5/0051; H04L 5/0048; H04L 5/0057; H04L 5/00; H04L 1/02; H04W 24/10;
(Continued)

(56) References Cited

U.S. PATENT DOCUMENTS 8,654,727 B2 * 2/2014 Dai ..................... H04L 5/005
370/329
9,184,806 B2 * 11/2015 Kim ..................... H04B 7/0456
(Continued)

FOREIGN PATENT DOCUMENTS

WO    2017029213 A1    2/2017

OTHER PUBLICATIONS

Partial International Search Report—PCT/US2019/036817—ISA/EPO—dated Sep. 11, 2019.
(Continued)

*Primary Examiner* — Man U Phan
(74) *Attorney, Agent, or Firm* — Campbell C. Chiang; MG-IP Law PC

(57) ABSTRACT

Disclosed are techniques for transmitting reference signals (RS) for positioning. A method comprises transmitting or providing an instruction to transmit a first set of RS to a user equipment (UE) in accordance with a first set of RS transmission parameters, receiving a report containing information indicating whether a measurement performed by the UE is limited by a signal-to-noise ratio (SNR) of the first set of RS or a bandwidth of the first set of RS, determining a second set of RS transmission parameters using the received report, wherein the second set of RS transmission parameters is different from the first set of RS transmission parameters, and transmitting a second set of RS to the UE in accordance with the second set of RS transmission parameters, or providing the second set of RS transmission parameters to a base station.

24 Claims, 12 Drawing Sheets

(58) Field of Classification Search
CPC ........ H04W 64/00; H04W 16/28; H04B 7/06;
H04B 7/0617; H04B 7/02; H04B 7/0408;
H04B 7/0417; H04B 7/0456; H04B
7/061; G01S 5/12; G01S 5/10
USPC .......................................................... 370/329
See application file for complete search history.

(56) References Cited

U.S. PATENT DOCUMENTS

| | | | |
|---|---|---|---|
| 9,247,392 B2* | 1/2016 | Raghupathy | H04W 4/025 |
| 9,362,997 B2* | 6/2016 | Kim | H04B 7/0617 |
| 9,755,797 B2* | 9/2017 | Wu | G01S 1/14 |
| 10,021,667 B2* | 7/2018 | Akkarakaran | G01S 5/10 |
| 10,389,418 B2* | 8/2019 | Kakishima | H04B 7/0456 |
| 10,411,777 B2* | 9/2019 | Islam | H04B 7/0617 |
| 10,708,879 B2* | 7/2020 | Kumar | H04W 64/006 |
| 10,736,074 B2* | 8/2020 | Edge | H04L 1/04 |
| 2012/0093101 A1 | 4/2012 | Dai et al. | |
| 2015/0049824 A1 | 2/2015 | Kim et al. | |
| 2017/0374637 A1 | 12/2017 | Akkarakaran et al. | |
| 2018/0049149 A1* | 2/2018 | Lee | H04W 24/10 |
| 2020/0229130 A1* | 7/2020 | Keating | H04W 24/10 |

OTHER PUBLICATIONS

International Search Report and Written Opinion—PCT/US2019/036817—ISA/EPO—dated Dec. 17, 2019.

* cited by examiner

POSITIONING REFERENCE SIGNAL TRANSMISSION WITH CONTROLLED TRANSMISSION POWER AND BANDWIDTH

CROSS-REFERENCE TO RELATED APPLICATION

The present Application for Patent claims priority under 35 U.S.C. § 119 to Greek Patent Application No. 20180100296, entitled "POSITIONING REFERENCE SIGNAL TRANSMISSION WITH CONTROLLED TRANSMISSION POWER AND BANDWIDTH," filed Jun. 29, 2018, assigned to the assignee hereof, and expressly incorporated herein by reference in its entirety.

TECHNICAL FIELD

Various aspects described herein generally relate to wireless communication systems, and more particularly, to transmission and reception of reference signals.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 gigahertz (GHz)). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 decibels (dB), relative to that observed in either the 2.4 GHz, or 5 GHz bands.

Propagation loss is also an issue in multiple input-multiple output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity to RF signals that arrive at a receiver along a specific direction. Transmit beamforming and receive beamforming may be used in conjunction with each other or separately, and references to "beamforming" may hereinafter refer to transmit beamforming, receive beamforming, or both, depending on the context. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To facilitate position estimations in terrestrial wireless networks, a base station (BS) may be configured to transmit reference signals (RS). The RS may include a pseudo-random code and may be transmitted on one or more predetermined frequencies in accordance with a predetermined timing. The RS may be received by a user equipment (UE) and may be used by the UE to determine, for example, a distance from the BS to the UE.

The distance may be estimated based on the known speed of electromagnetic radiation and a calculated delay relating to a time of flight (TOF) of the RS. In some implementations, the UE may generate a local mirror of the transmitted RS and perform a comparison between the received RS and the local mirror. The UE may identify a delay value representing the difference between the start time of the local mirror and the start time of the received RS, i.e., the TOF of the RS.

The accuracy of the RS measurements may be limited by, for example, interference in the wireless communication environment surrounding the UE. In accordance with a conventional technique, the BS may boost the transmission power of the RS in an effort to improve the accuracy of the RS measurements. Although this is an adequate approach under some circumstances, there are other circumstances where power boosting at the BS has no effect on measurement accuracy at the UE. As a result, the BS may consume more power without facilitating more accurate measurements. Accordingly, new techniques are needed for improving measurement accuracy under a greater variety of circumstances, without unnecessary power consumption.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

in an aspect, a method for transmitting RS for positioning includes transmitting or providing an instruction to transmit a first set of RS to a UE in accordance with a first set of RS transmission parameters, receiving a report containing information indicating whether a measurement performed by the UE is limited by: a signal-to-noise ratio (SNR) of the first set of RS; or a bandwidth of the first set of RS, determining a second set of RS transmission parameters based on the received report, wherein the second set of RS transmission parameters is different from the first set of RS transmission parameters, and transmitting or providing an instruction to transmit a second set of RS to the UE in accordance with the second set of RS transmission parameters.

In an aspect, a method for transmitting RS for positioning includes comparing a bandwidth parameter value of RS to be transmitted to a UE to a bandwidth parameter threshold, setting a range of power values for the RS to a first subset of power values in response to a determination that the bandwidth parameter value is greater than the bandwidth parameter threshold, setting the range of power values for the RS to a second subset of power values in response to a determination that the bandwidth parameter value is less than the bandwidth parameter threshold, and transmitting the RS to the UE or providing an instruction to transmit the RS to the UE in accordance with the bandwidth parameter value and a second power parameter value selected from the set range of power values.

In an aspect, a method for receiving RS for positioning includes receiving, from a base station and at a UE, a first set of RS having a first set of RS transmission parameters, transmitting to the base station a report containing information indicating whether a measurement performed by the UE is limited by: a SNR of the first set of RS, or a bandwidth of the first set of RS, and receiving, from the base station and at the UE, a second set of RS having a second set of RS transmission parameters.

In an aspect, an apparatus for transmitting RS for positioning includes at least one transceiver configured to: transmit or provide an instruction to transmit a first set of RS to a UE in accordance with a first set of RS transmission parameters, receive a report containing information indicating whether a measurement performed by the UE is limited by a SNR of the first set of RS or a bandwidth of the first set of RS, and transmit or provide an instruction to transmit a second set of RS to the UE in accordance with a second set of RS transmission parameters, a memory system configured to store data and/or instructions, and a processing system, coupled to the memory and the at least one transceiver, that is configured to: select the second set of RS transmission parameters using the received report, wherein the second set of RS transmission parameters is different from the first set of RS transmission parameters.

In an aspect an apparatus configured to transmit RS for positioning includes at least one transceiver configured to: transmit RS to a UE or provide an instruction to transmit the RS to the UE in accordance with a bandwidth parameter value and a second power parameter value selected from a set range of power values, a memory system configured to store data and/or instructions, and a processing system, coupled to the memory and the at least one transceiver, that is configured to: compare the bandwidth parameter value to a bandwidth parameter threshold, set a range of power values for the RS to a first subset of power values in response to a determination that the bandwidth parameter value is greater than the bandwidth parameter threshold, set the range of power values for the RS to a second subset of power values in response to a determination that the bandwidth parameter value is less than the bandwidth parameter threshold.

In an aspect, an apparatus for receiving reference signals (RS) for positioning includes at least one transceiver, a memory system configured to store data and/or instructions, and a processing system, coupled to the memory and the at least one transceiver, wherein one or more of the at least one transceiver, the memory system, and the processing system are configured to: receive, from a base station and at a UE, a first set of RS having a first set of RS transmission parameters, transmit to the base station a report containing information indicating whether a measurement performed by the UE is limited by: a SNR of the first set of RS, or a bandwidth of the first set of RS, and receive, from the base station and at the UE, a second set of RS having a second set of RS transmission parameters.

In an aspects, an apparatus for transmitting RS for positioning includes means for transmitting or providing an instruction to transmit a first set of RS to a UE in accordance with a first set of RS transmission parameters, means for receiving a report containing information indicating whether a measurement performed by the UE is limited by: a SNR of the first set of RS, or a bandwidth of the first set of RS, means for determining a second set of RS transmission parameters using the received report, wherein the second set of RS transmission parameters is different from the first set of RS transmission parameters, and means for transmitting or providing an instruction to transmit a second set of RS to the UE in accordance with the second set of RS transmission parameters.

In an aspect an apparatus configured to transmit RS for positioning includes means for comparing a bandwidth parameter value of RS to be transmitted to a UE to a bandwidth parameter threshold, means for setting a range of power values for the RS to a first subset of power values in response to a determination that the bandwidth parameter value is greater than the bandwidth parameter threshold, means for setting the range of power values for the RS to a second subset of power values in response to a determination that the bandwidth parameter value is less than the bandwidth parameter threshold, and means for transmitting the RS or providing an instruction to transmit the RS to the UE to the UE in accordance with the bandwidth parameter value and a second power parameter value selected from the set range of power values.

In an aspect, an apparatus for receiving RS for positioning includes means for receiving, from a base station and at a UE, a first set of RS having a first set of RS transmission parameters, means for transmitting to the base station a report containing information indicating whether a measurement performed by the UE is limited by: a SNR of the first set of RS, or a bandwidth of the first set of RS, and means for receiving, from the base station and at the UE, a second set of RS having a second set of RS transmission parameters.

In an aspect, a non-transitory computer-readable storage medium comprising at least one instruction for causing a processor to perform operations includes at least one instruction comprising code for transmitting or providing an instruction to transmit a first set of RS to a UE in accordance with a first set of RS transmission parameters, code for receiving a report containing information indicating whether a measurement performed by the UE is limited by: a SNR of the first set of RS, or a bandwidth of the first set of RS, code for determining a second set of RS transmission parameters using the received report, wherein the second set of RS transmission parameters is different from the first set of RS transmission parameters, and code for transmitting or providing an instruction to transmit a second set of RS to the UE in accordance with the second set of RS transmission parameters.

In an aspect, a non-transitory computer-readable medium comprising at least one instruction for causing a processor to perform operations associated with transmission of RS for positioning includes at least one instruction comprising code for comparing a bandwidth parameter value of RS to be transmitted to a UE to a bandwidth parameter threshold, code for setting a range of power values for the RS to a first subset of power values in response to a determination that the bandwidth parameter value is greater than the bandwidth parameter threshold, code for setting the range of power values for the RS to a second subset of power values in response to a determination that the bandwidth parameter value is less than the bandwidth parameter threshold, and code for transmitting the RS to the UE or providing an instruction to transmit the RS to the UE in accordance with the bandwidth parameter value and a second power parameter value selected from the set range of power values.

In an aspect, a non-transitory computer-readable medium comprising at least one instruction for causing a processor to perform operations associated with reception of RS includes at least one instruction comprising code for receiving, from a base station and at a UE, a first set of RS having a first set of RS transmission parameters, code for transmitting to the base station a report containing information indicating whether a measurement performed by the UE is limited by: a SNR of the first set of RS, or a bandwidth of the first set of RS, and code for receiving, from the base station and at the UE, a second set of RS having a second set of RS transmission parameters.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
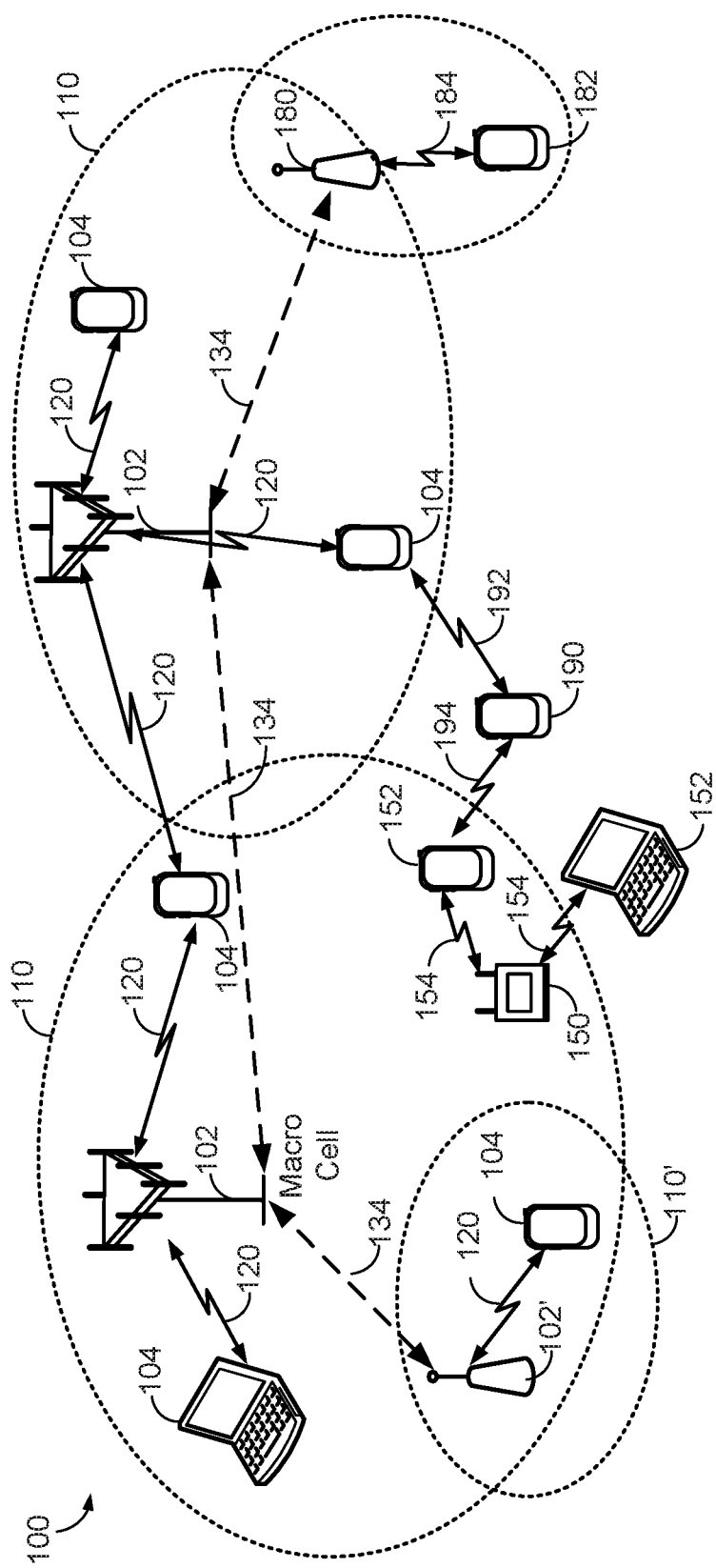
FIG. 1 illustrates an exemplary wireless communications system, according to various aspects.

As noted above, the accuracy of RS measurements performed by a UE may be limited by interference. For example, if there is a low SNR associated with a channel carrying an RS, it may be more difficult to identify a peak correlation between the received RS and a local mirror of the transmitted RS. As another example, if the RS is transmitted across a small BW, then the accuracy of the measurement may be limited by a slow decay rate of the correlation function.

In accordance with aspects of the disclosure, the UE and/or BS may determine how best to improve the accuracy of RS measurements. The UE may provide measurements and/or requests to the BS to enable the BS to determine the optimal way to improve accuracy. In some scenarios, the accuracy may be SNR-limited, whereas in other scenarios, the accuracy may be BW-limited. The BS may increase a transmission power (TP) associated with the RS in response to a determination that the accuracy of the measurements performed by the UE is SNR-limited. Alternatively, the BS may widen the BW associated with the RS in response to a determination that the accuracy of the measurements performed by the UE is BW-limited.

The BS may also recognize that certain combinations of TP and BW increase the impact of interference in the wireless communication environment. For example, the BS may determine that if the BW exceeds a BW threshold, the TP should be limited to avoid excessive noise. As noted above, in a scenario where measurement accuracy is SNR-limited, the BS may be configured to increase TP. However, depending on the channel BW, increased power may result in unacceptable interference. Accordingly, in a scenario where measurement accuracy is SNR-limited, but the power is already at a maximum value (determined based on the channel BW), the BS may determine that measurement accuracy cannot be improved.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein is for the purpose of describing particular embodiments only and not to limit any embodiments disclosed herein. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted (unless specified otherwise) as "based at least in part on" rather than, for example, "based solely on." It will be understood that terms such as "top" and "bottom," "left" and "right," "vertical" and "horizontal," etc., are relative terms used strictly in relation to one another, and do not express or imply any relation with respect to gravity, a manufacturing device used to manufacture the components described herein, or to some other device to which the components described herein are coupled, mounted, etc.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a RAN and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire®.

Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The wireless communications system 100 may further include a mmW base station 180 that may operate in mmW frequencies and/or near mmW frequencies in communication with a UE 182. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connect indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth®, and so on.

Figure 2A:
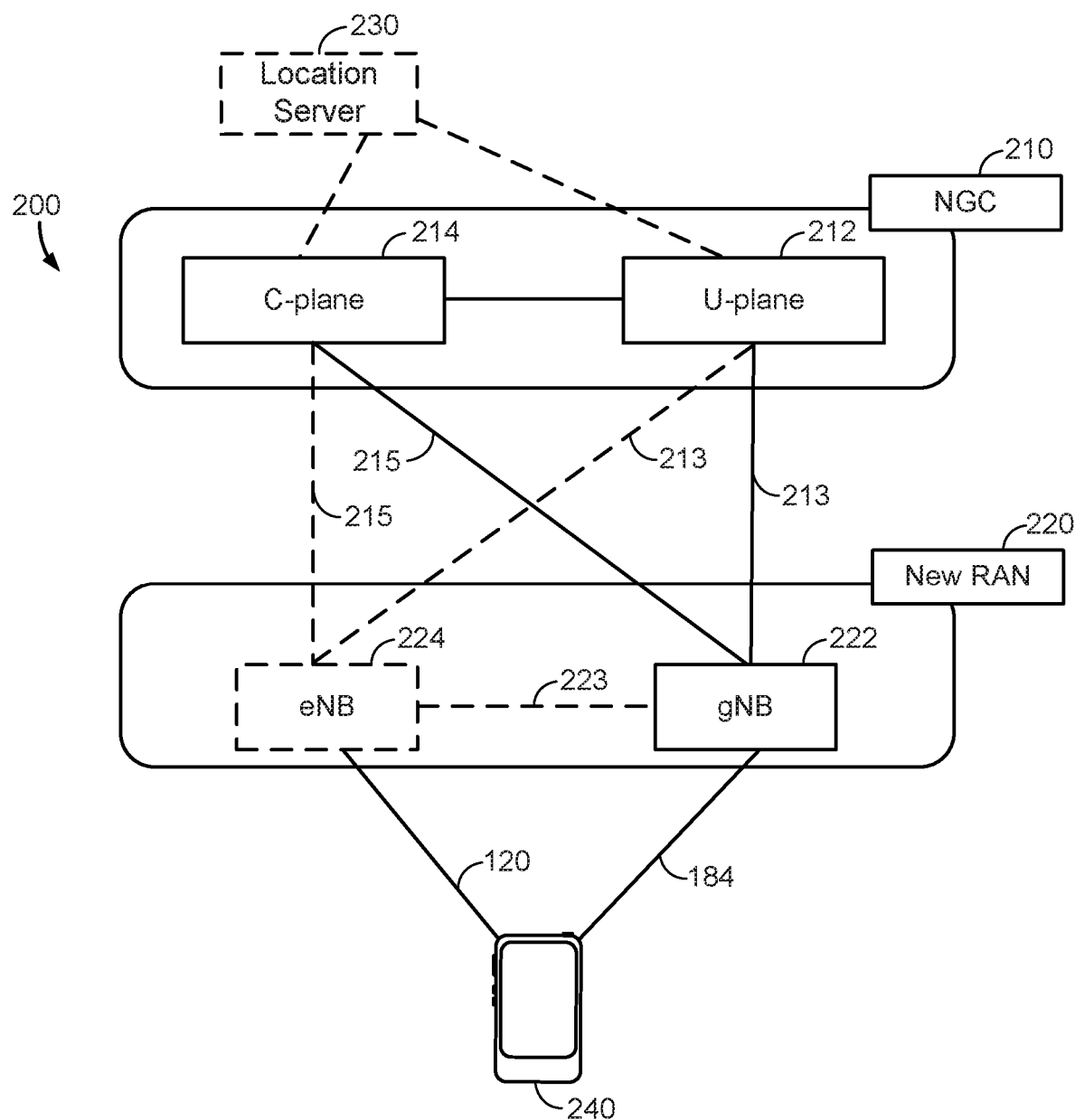
FIG. 2A illustrates example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
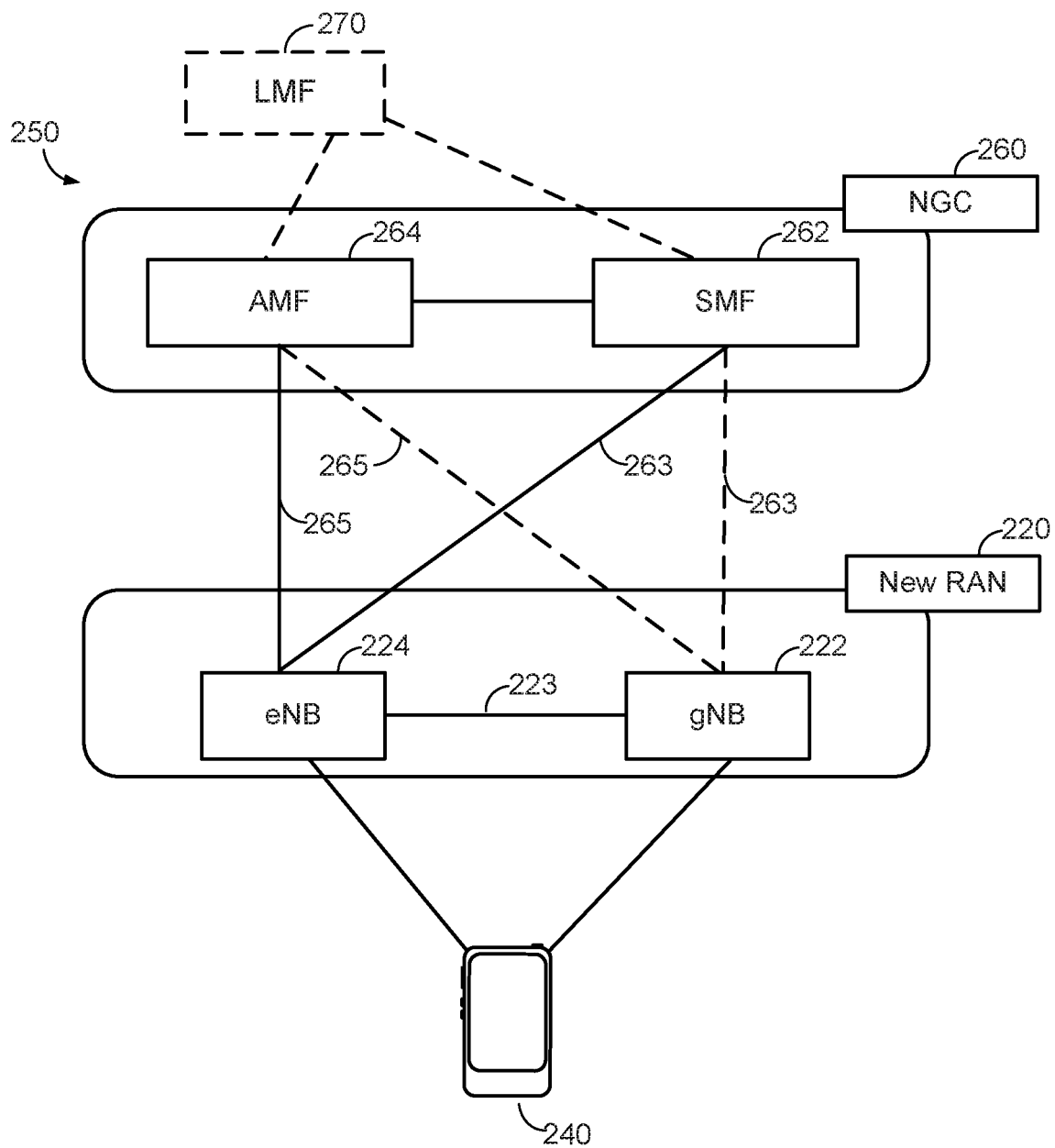
FIG. 2B illustrates additional example wireless network structures, according to various aspects.

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3:
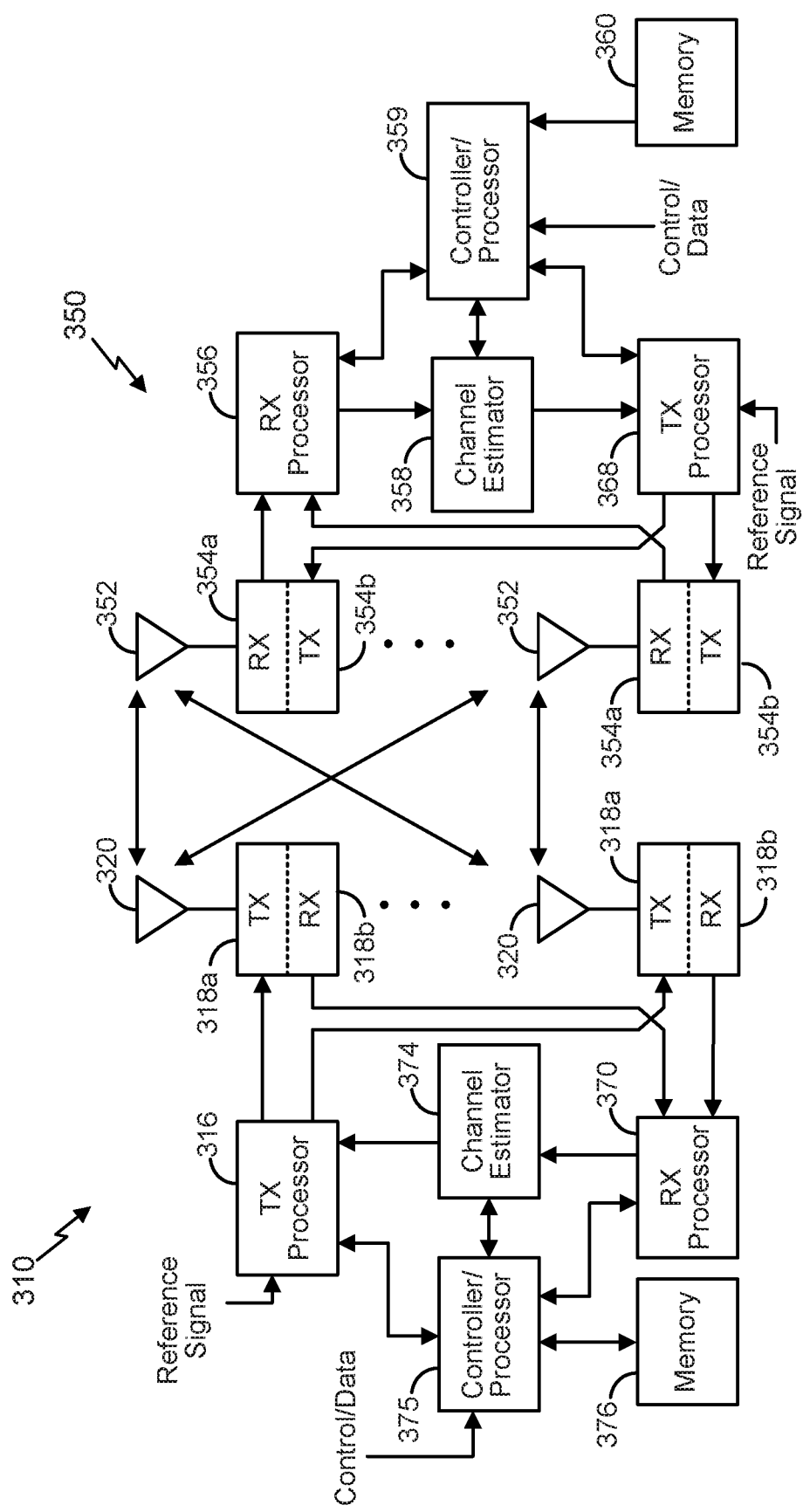
FIG. 3 illustrates an exemplary base station and an exemplary UE in an access network, according to various aspects.

According to various aspects, FIG. 3 illustrates an exemplary base station (BS) 310 (e.g., an eNB, a gNB, a small cell AP, a WLAN AP, etc.) in communication with an exemplary UE 350 (e.g., any of the UEs depicted in FIG. 1, such as UEs 104, UE 152, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIGs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the processing system 359, which implements Layer-3 and Layer-2 functionality.

The processing system 359 can be associated with a memory 360 that stores program codes and data. The memory 360 may be referred to as a non-transitory computer-readable medium. In the UL, the processing system 359 provides demultiplexing between transport and logical channels, packet reassembly, deciphering, header decompression, and control signal processing to recover IP packets from the core network. The processing system 359 is also responsible for error detection.

Similar to the functionality described in connection with the DL transmission by the base station 310, the processing system 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The processing system 375 can be associated with a memory 376 that stores program codes and data. The memory 376 may be referred to as a non-transitory computer-readable medium. In the UL, the processing system 375 provides demultiplexing between transport and logical channels, packet reassembly, deciphering, header decompression, control signal processing to recover IP packets from the UE 350. IP packets from the processing system 375 may be provided to the core network. The processing system 375 is also responsible for error detection.

Figure 4:
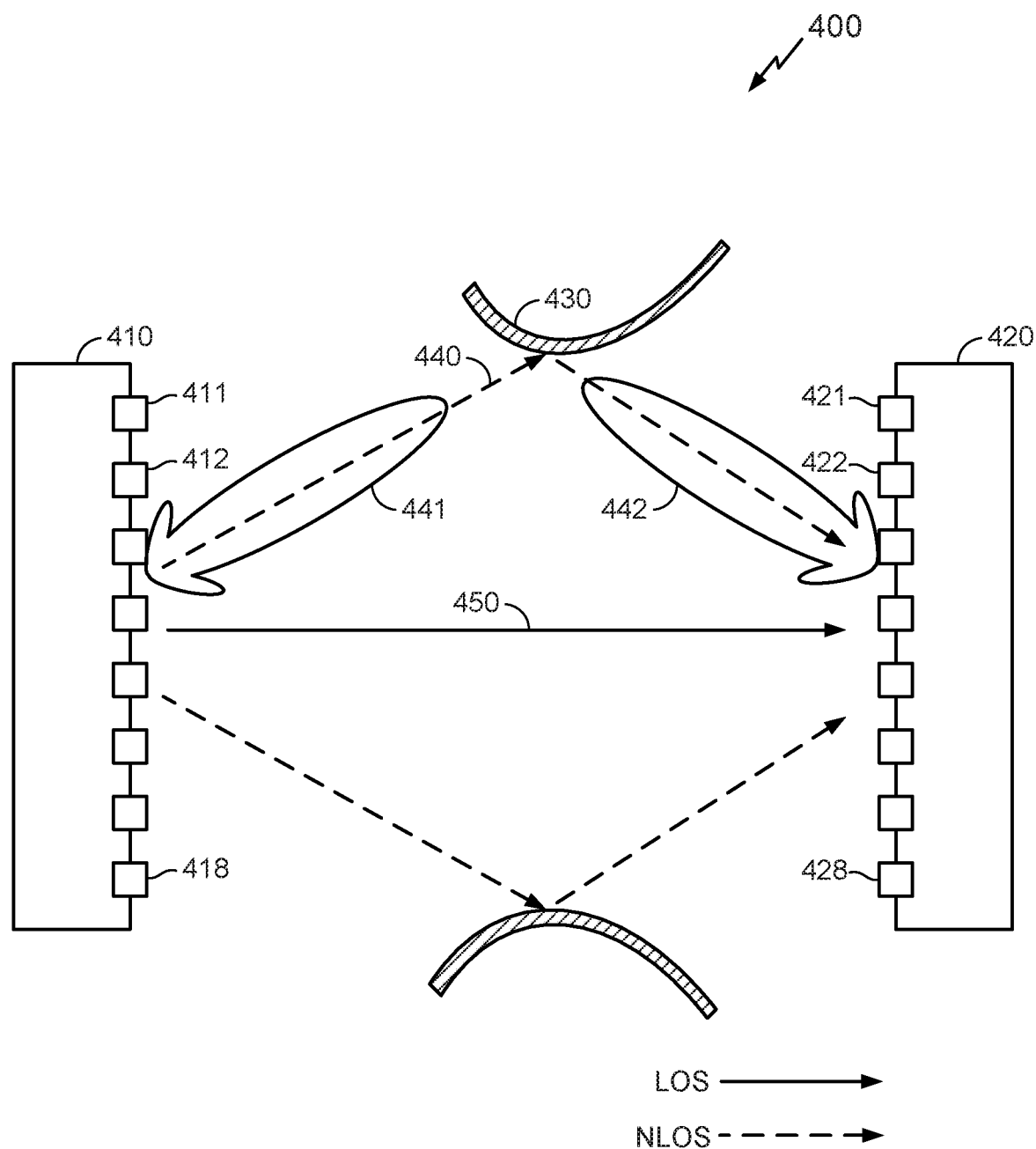
FIG. 4 illustrates an exemplary wireless communications system according to various aspects of the disclosure.

FIG. 4 illustrates an exemplary wireless communication environment 400 according to various aspects of the disclosure. As depicted in FIG. 4, a BS 410 and a UE 420 appear within the wireless communication environment 400. In the example of FIG. 4, the UE 420, which may correspond to any of the UEs described above (e.g., UEs 104, UE 182, UE 190, etc., UE 240 in FIG. 2A/B, UE 350 in FIG. 3), is attempting to calculate an estimate of its position, or assist another entity to calculate an estimate of its position (e.g., a base station or core network component, another UE, a location server, a third party application, etc.). The UE 420 may communicate wirelessly with a BS 410. The BS 410 may correspond to any combination of base stations 102 or 180 and/or WLAN AP 150 in FIG. 1, and may use RF signals and standardized protocols for the modulation of the RF signals and the exchange of information packets. By extracting different types of information from the exchanged RF signals, and utilizing the layout of the wireless communication environment 400 (i.e., the base stations locations, geometry, etc.) the UE 420 may determine its position, or assist in the determination of its position, in a predefined reference coordinate system. In an aspect, the UE 420 may specify its position using a two-dimensional coordinate system; however, the aspects disclosed herein are not so limited, and may also be applicable to determining positions using a three-dimensional coordinate system, if the extra dimension is desired.

To support position estimates, the BS 410 may be configured to broadcast reference RF signals (e.g., positioning reference signals (PRS), cell-specific reference signals (CRS), channel state information reference signals (CSI-RS), synchronization signals, etc.) throughout their coverage area to enable the UE 420 to measure reference RF signal timing differences (e.g., observed time different of arrival (OTDOA) or reference signal timing difference (RSTD)) between pairs of network nodes and/or to identify the beam that best excite the LOS or shortest radio path between the UE 420 and the transmitting BS 410. Identifying the LOS/shortest path beam(s) is of interest not only because these beams can subsequently be used for OTDOA measurements between a pair of BS 410, but also because identifying these beams can directly provide some positioning information based on the beam direction. Moreover, these beams can subsequently be used for other position estimation methods that utilize precise time of arrival (ToA), such as round-trip time (RTT) estimation based methods.

As used herein, a "network node" may be a base station, a cell of a base station, a remote radio head, an antenna of a base station (where the locations of the antennas of a base station are distinct from the location of the base station itself), or any other network entity capable of transmitting reference signals. Further, as used herein, a "node" may refer to either a network node or a UE.

A location server (e.g., location server 230) may send assistance data to the UE 420 that includes an identification of one or more neighbor cells of BS 410 and configuration information for reference RF signals transmitted by each neighbor cell. Alternatively, the assistance data can originate directly from the UE 420 itself (e.g., in periodically broadcasted overhead messages, etc.). Alternatively, the UE 420 can detect neighbor cells of the BS 410 without the use of assistance data. The UE 420 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the BS 410 or antenna(s) that transmitted the reference RF signals that the UE 420 measured), the UE 420 or the location server can determine the distance between the UE 420 and the measured network nodes and thereby calculate the location of the UE 420.

Mathematically, a time of arrival $T_i$ may be calculated as $T_i = \tau_i + D_i/c$, wherein $\tau_i$ is the sum of the transmission time from cell i, non-line of sight (NLOS) transmission time, and UE timing measurement noise, $D_i$ is the Euclidean distance between cell i with location ($q_i$) and UE with location (p), and c is the speed of light in air, for example, 299,700 km/s. The formula used for Euclidian distance may be $$c(T_k - \tau_k) = \sqrt{2} R \sqrt{1 - \sin(\varphi_1)\sin(\varphi_2) - \cos(\varphi_1)\cos(\varphi_2)\cos(\beta_1 - \beta_2)},$$

wherein D is the distance between two points on the surface of the earth, R is the radius of the earth (e.g., 6371 km), $\varphi_1$ and $\varphi_2$ are the latitude (in radians) of a first point and a second point, respectively, and $\beta_1$ and $\beta_2$ are the longitude (in radians) of the first point and the second point, respectively.

The term "position estimate" is used herein to refer to an estimate of a position for a UE 420, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other similar term. The means of obtaining a location estimate may be referred to generically as "positioning," "locating," "position fixing," or some other similar term. A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, the BS 410 may include an array of co-located antenna elements (e.g., as in a MIMO system or where the base station employs beamforming), each antenna in the array having a distinct physical transmission point. The term "base station" may also refer to multiple non-co-located physical transmission points, for example, a distributed antenna system (DAS) (a network of spatially separated antennas connected to a common source via a transport medium) or a remote radio head (RRH) (a remote base station connected to a serving base station). Alternatively, the non-co-located physical transmission points include a serving base station (e.g., BS 410) and for example neighbor base station (not shown).

As depicted in FIG. 4, the BS 410 may include a plurality of co-located antenna elements. In FIG. 4, the BS 410 has eight antenna elements, three of which are labeled with reference numerals, including a first BS antenna element 411, a second BS antenna element 412, and an eighth BS antenna element 418. Although eight BS antenna elements are depicted in FIG. 4, it will be understood that there may be any number of antenna elements in the plurality of antenna elements, for example, one, two, sixteen, etc.

The UE 420 may also include a plurality of co-located antenna elements. In FIG. 4, the UE 420 has eight antenna elements, three of which are labeled with reference numerals, including a first UE antenna element 421, a second UE antenna element 422, and an eighth UE antenna element 428. Although eight UE antenna elements are depicted in FIG. 4, it will be understood that there may be any number of antenna elements in the plurality of antenna element, for example, one, two, sixteen, etc.

The wireless communication environment 400 may further include one or more reflective objects such as a reflective object 430. Because of the presence of the one or more reflective objects, the RF signals transmitted by the BS 410 may travel any number of paths from the BS 410 to the UE 420. As shown in FIG. 4, a signal path 440 travels a NLOS path in which it is transmitted in the direction of the reflective object 430 and reflected by the reflective object 430 in the direction of the UE 420. By contrast, a signal path 450 travels a LOS path in which it travels directly from the BS 410 to the UE 420.

As noted above, the plurality of antenna elements associated with the BS 410 enable the BS 410 to beamform, thereby focusing a transmission of RF signals. FIG. 4 depicts a transmission beam 441 and a reception beam 442 associated with the signal path 440. The transmission beam 441 may focus the RF signals in a particular direction (e.g., the direction of the reflective object 430), whereas the reception beam 442 may selectively receive RF signals propagating from a particular direction (e.g., from the direction of the reflective object 430). Although not depicted in FIG. 4, the signal path 450 may also be associated with a transmission beam and/or a reception beam.

It will be understood that the signal path 450, which is an LOS signal path, is likely to result in an accurate measurement of the distance between the BS 410 and the UE 420, whereas the signal path 440, which is an NLOS signal path, will tend to measure a longer TOF, making the distance between the BS 410 and the UE 420 seem longer than it actually is.

Although the signal path 440 and the signal path 450 as depicted in FIG. 4 are associated with different beams, it will be understood that even within a single beam, there may be multiple paths from the BS 410 to the UE 420. As described further below, the receiver may receive multiple "RF signals" corresponding to each transmitted RF signal due to the propagation characteristics of RF signals through multipath channels.

Where a BS 410 uses beamforming to transmit RF signals, the beams of interest for data communication between the BS 410 and the UE 420 may be the beams carrying RF signals that arrive at the UE 420 with the highest signal strength (as indicated by, for example, the received signal received power (RSRP) or signal to noise plus interference ratio (SINR) in the presence of a directional interfering signal), whereas the beams of interest for position estimation may be the beams carrying RF signals that excite the shortest path or LOS path (e.g., an LOS path 450). In some frequency bands and for antenna systems typically used, these will be the same beams. However, in other frequency bands, such as mmW, where typically a large number of antenna elements can be used to create narrow transmit beams, they may not be the same beams. As described below with reference to FIGS. 5A-5B, in some cases, the signal strength of RF signals on the LOS path 450 may be weaker (e.g., due to obstructions) than the signal strength of RF signals on an NLOS path 440, over which the RF signals arrive later due to propagation delay.

Figure 5A:
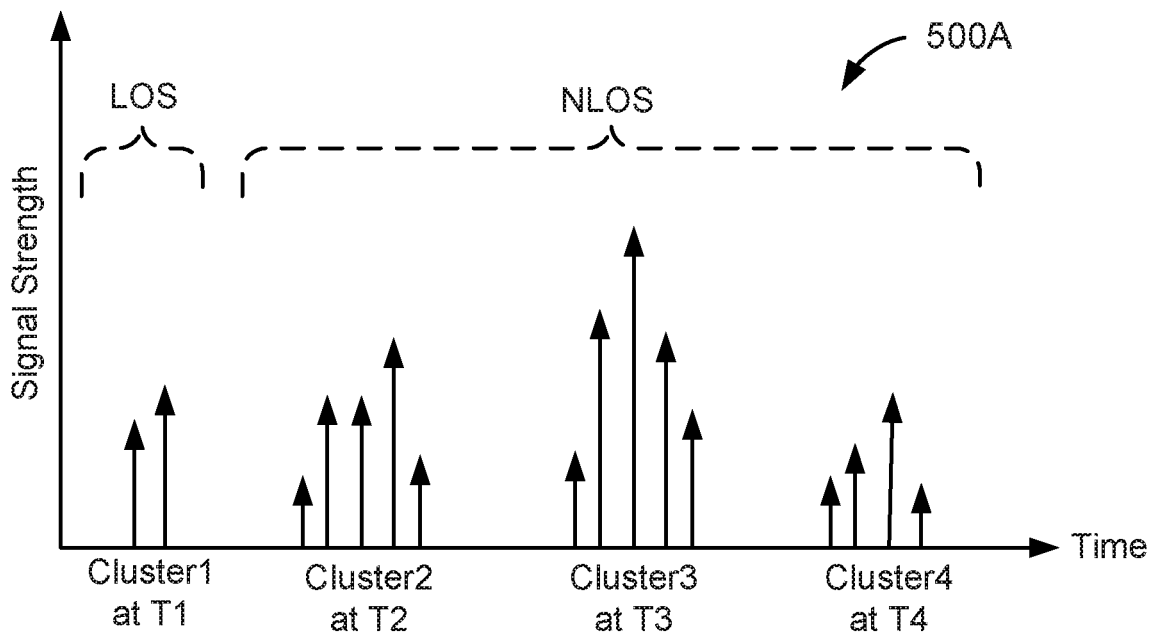
FIG. 5A is a graph showing the RF channel response at a UE over time according to aspects of the disclosure.

FIG. 5A is a graph 500A showing the RF channel response at a receiver (e.g., the UE 420) over time according to aspects of the disclosure. Under the channel illustrated in FIG. 5A, the receiver detects a first cluster of two channel taps at time T1, a second cluster of five channel taps at time T2, a third cluster of five channel taps at time T3, and a fourth cluster of four channel taps at time T4. A cluster of channel taps is the first detectable occurrences of a received RF signal/data stream.

In the example of FIG. 5A, because the first cluster of channel taps at time T1 is detected first, the corresponding data stream is presumed to be on the LOS signal path, or at least, the shortest NLOS signal path. Beams of interest may be, for example, beams with an earliest first-detected channel tap and/or beams whose first-detected channel tap is within a predetermined delay from the first detected tap of the beam with the earliest channel tap. Note that although FIG. 5A illustrates clusters of two to five channel taps, as will be appreciated, the clusters may have a single channel tap or more than five detected channel taps.

Figure 5B:
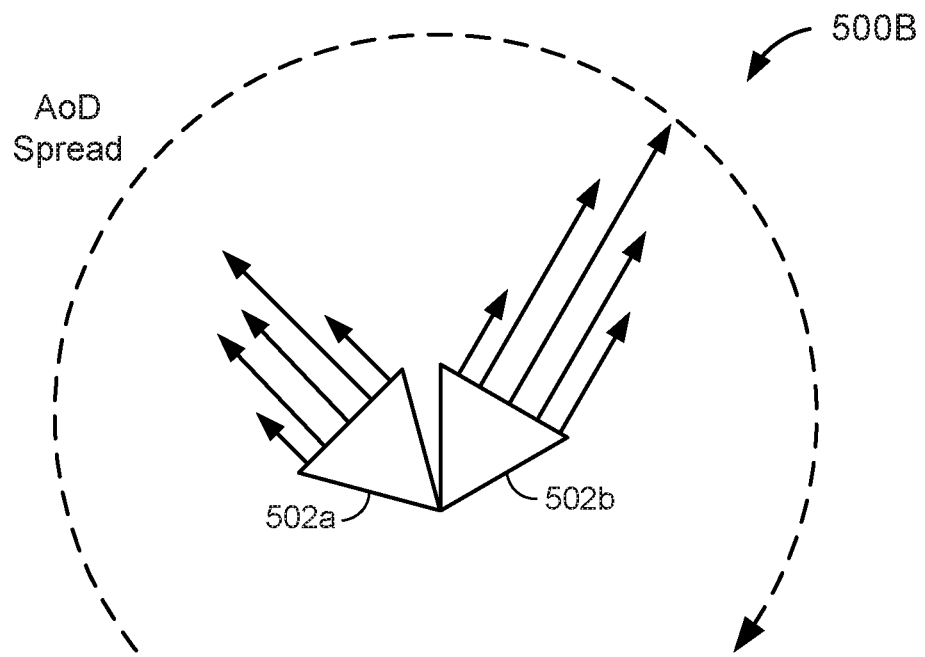
FIG. 5B illustrates an exemplary separation of clusters in Angle of Departure (AoD), according to aspects of the disclosure.

FIG. 5B illustrates separation of clusters in angle of departure (AoD), according to aspects of the disclosure. The RF signal transmitted by the transmitter in AoD range 502a may be received at the receiver as a first cluster (e.g., "Cluster1") in FIG. 5A, and the RF signal transmitted in AoD range 502b may be received at the receiver as a different cluster (e.g., "Cluster3") in FIG. 5A. Note that although the AoD ranges depicted in FIG. 5B are spatially isolated, the AoD ranges corresponding to some received clusters may also partially overlap, even though the clusters are separated in time. For example, this may arise when two separate buildings at the same AoD from the transmitter reflect the RF signal towards the receiver.

With continued reference to FIG. 5B, the transmitter may utilize beamforming to transmit a plurality of beams of RF signals such that one of the beams is directed at the AoD range 502a, corresponding to the first cluster of channel taps in FIG. 5A, and a different beam is directed at the AoD range 502b, corresponding to the third cluster of channel taps in FIG. 5A. The signal strength of clusters in the post-beamforming channel response (i.e., the channel response when the transmitted RF signal is beamformed instead of omni-directional) will be scaled by the beam gain along the AoD corresponding to the clusters. In that case, the beam of interest for positioning would be the beam directed at the AoD range 502a associated with the first cluster of RF signals (because it arrives first) and the beam of interest for data communications may be the beam directed at the AoD range 502b associated with the third cluster of RF signals (because it is the strongest).

In general, when transmitting an RF signal, the transmitter (e.g., BS 410) may not know what path the RF signal will follow to the UE 420 or at what time it will arrive at the UE 420, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain aspects.

As discussed above, in some frequency bands, the shortest path (which may, as noted above, be a LOS path or the shortest NLOS path) may be weaker than an alternative longer (NLOS) path (over which the RF signal arrives later due to propagation delay). The weaker signal may have a low SNR. Accordingly, the BS 410 and/or UE 420 may determine that the accuracy of position measurements associated with the UE 420 is SNR-limited. Alternatively, the BS 410 and/or the UE 420 may determine that the accuracy of position measurement associated with the UE 420 is BW-limited. As will be discussed in greater detail below, the BS 410 may identify the reason for limitation of the UE 420 and take corrective action.

Figure 6:
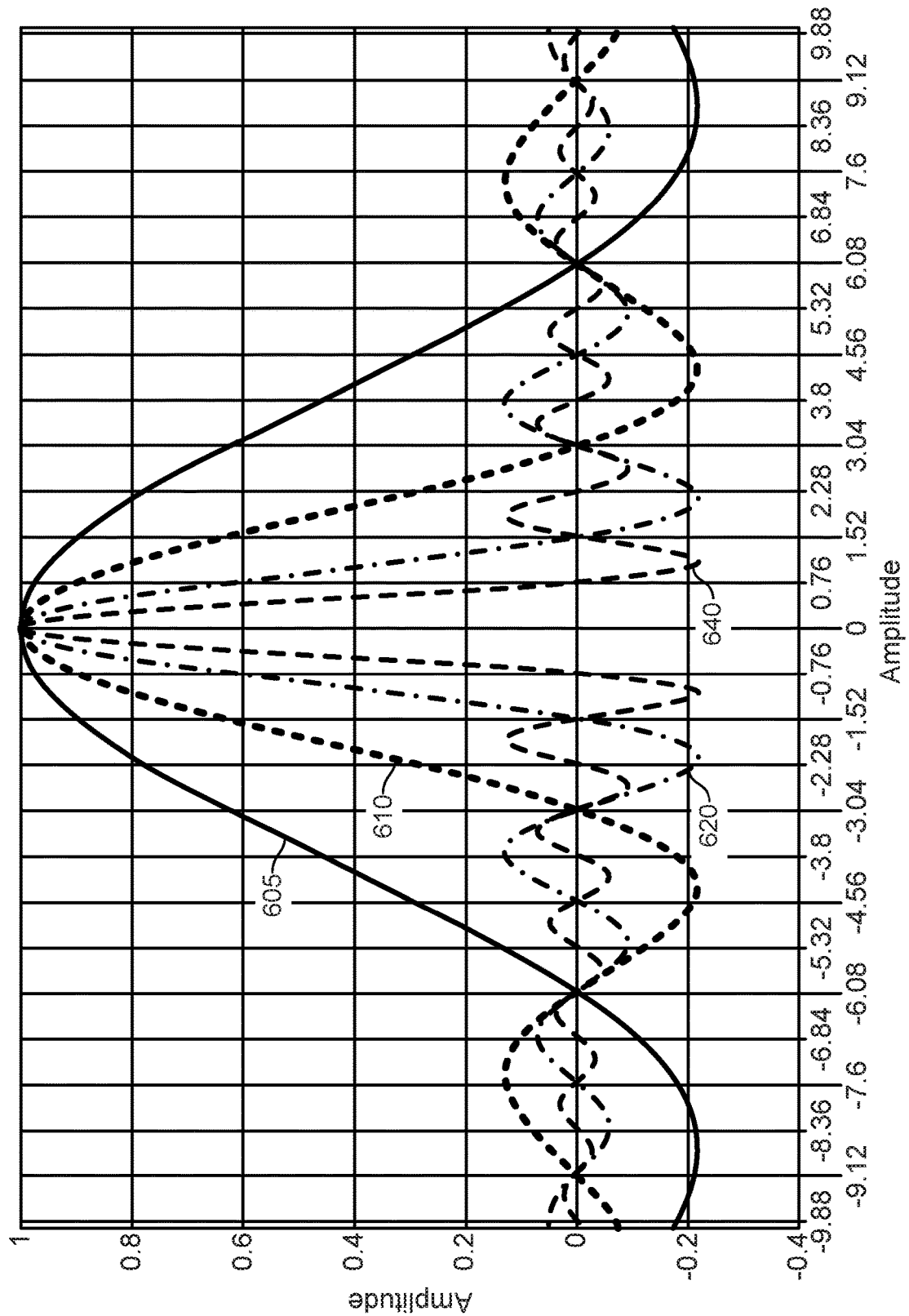
FIG. 6 illustrates a chart showing the relationship between signal-to-noise (SNR) ratio and bandwidth (BW), according to aspects of the disclosure.

FIG. 6 illustrates a chart showing the relationship between transmission bandwidth (BW) and measurement accuracy. The chart depicted in FIG. 6 includes an x-axis corresponding to an offset (measured, for example, in meters) and a y-axis corresponding to an amplitude of a measurement. The measurement may be a measurement of a correlation between an RS received at the UE 420 and a local mirror of the RS as transmitted by the BS 410. The peak correlation (e.g., having an amplitude greater than 0.8, 0.9, or some other suitable value) may correspond to a particular amount of offset.

The chart includes measurements associated with different transmission BWs, in particular, a 50 MHz measurement 605, a 100 MHz measurement 610, a 200 MHz measurement 620, and a 400 MHz measurement 640. As will be understood from FIG. 6, narrower bands (50 MHz measurement 605 being the narrowest) have peaks that may potentially correspond to a wider range of offsets. For example, if an amplitude of 0.8 or higher is considered a peak, then the peak associated with the 50 MHz measurement 605 is associated with an offset in the range of approximately −2 m to +2 m. By contrast, the peak associated with the 100 MHz measurement 610 may be associated with an offset in the range of approximately −1 m to +1 m. Wider BWs (including the 200 MHz measurement 620 and the 400 MHz measurement 640) correspond to increasingly accurate measurements with narrower ranges (−0.5 m to +0.5 m and −0.25 m to +0.25 m, respectively).

The relationship depicted in FIG. 6 indicates that wider BWs are associated with more accurate measurements. However, as a practical matter, more power is needed to transmit wider BWs. As a result, when transmitting the RS on a wider BW, the BS 410 may reduce the TP associated with the RS to keep power consumption in check. The UE 420 may therefore experience reduced SNR due to the reduced TP of the RS.

Accordingly, if the BS 410 attempts to facilitate more accurate measurements at the UE 420 by widening the BW of the RS signal (enabling more accurate measurements), it may be forced to reduce TP of the RS signal, causing a reduction in SNR experienced at the UE 420 (resulting in less accurate measurements). Therefore, it is uncertain as to whether widening the BW of the RS signal leads to improved measurement accuracy at the UE 420. In accordance with aspects of the disclosure, as will be discussed in greater detail below, the BS 410 and/or the UE 420 may determine whether low SNR or narrow BW is the primary limiting factor with respect to the accuracy of measurements performed at the UE 420. If the BS 410 knows that the UE 420 is BW-limited, it can widen the BW (e.g., from 50 MHz to 100 MHz). Since the BS 410 knows that the issue is BW, the BS 410 does not need to unnecessarily increase the power of the RS. By contrast, if the BS 410 knows that the UE 420 is SNR-limited, it can increase the TP of the RS transmission. In this case, since the BS 410 knows that the issue is power, the BS 410 does not need to unnecessarily increase BW.

Figure 7:
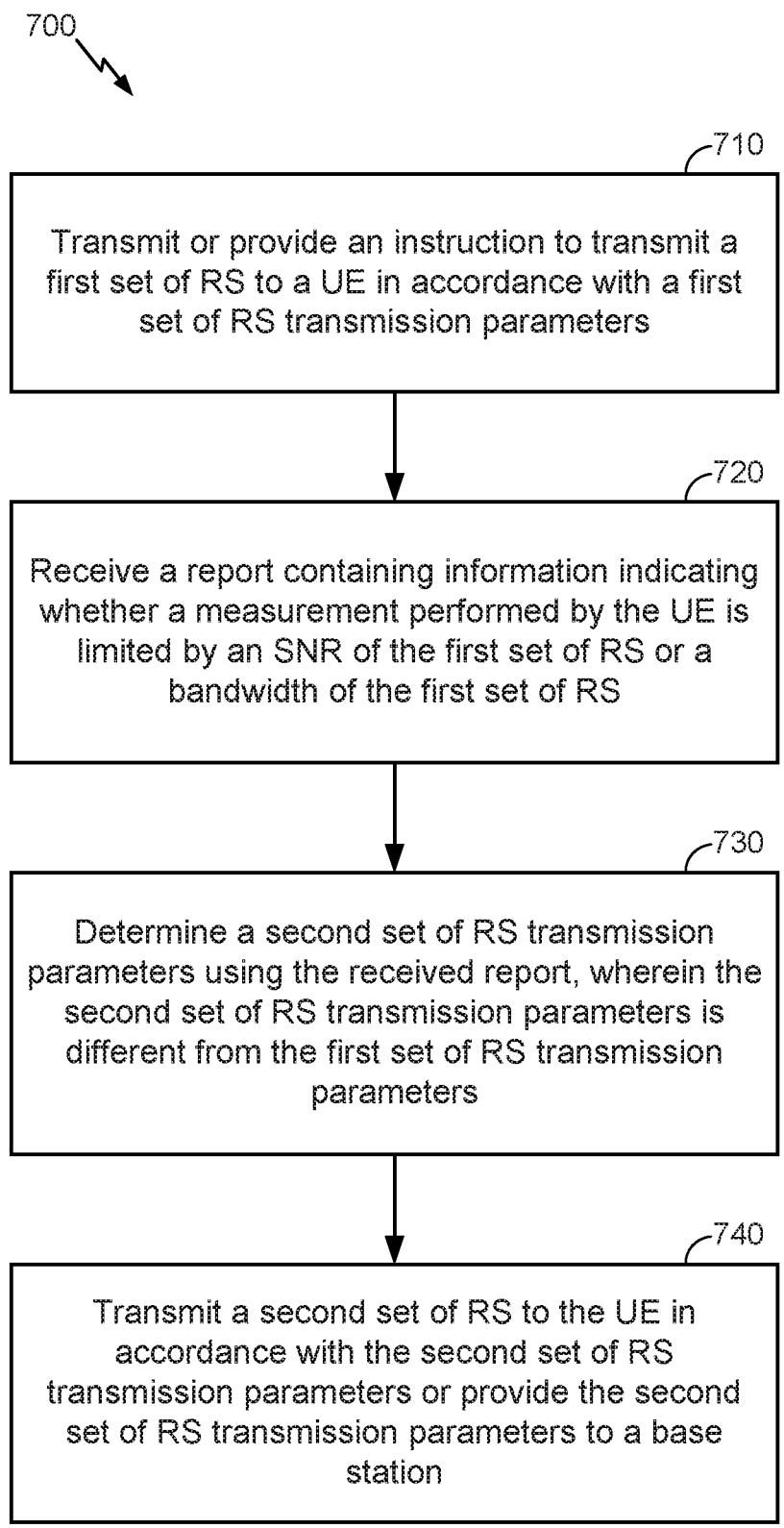
FIG. 7 illustrates an exemplary method according to various aspects of the disclosure.

FIG. 7 illustrates an exemplary method 700 according to various aspects of the disclosure. The method 700 depicted in FIG. 7 may be performed by, for example, any of the base stations described above, such as the BS 310 depicted in FIG. 3, one or more of the components that make up the BS 310, and/or the BS 410 depicted in FIG. 4. Additionally or alternatively, the method 700 depicted in FIG. 7 may be performed by, for example, a network node. However, the method 700 will be described as it would be performed by the BS 310 depicted in FIG. 3.

At 710, the method 700 transmits or provides an instruction to transmit a first set of RS to a UE (any of the UEs described above) in accordance with a first set of RS transmission parameters. The transmitting or providing of the instruction may be performed by, for example, the TX processor 316 and/or one or more of the transmitters 318a depicted in FIG. 3. Accordingly, the TX processor 316 and/or one or more of the transmitters 318a may constitute means for transmitting or providing an instruction to transmit a first set of RS to a UE in accordance with a first set of RS transmission parameters.

At 720, the method 700 receives a report containing information indicating whether a measurement performed by the UE is limited by an SNR of the first set of RS or a bandwidth of the first set of RS. The receiving may be performed by, for example, the RX processor 370 and/or one or more of the receivers 318b depicted in FIG. 3. Accordingly, the RX processor 370 and/or one or more of the receivers 318b may constitute means for receiving a report containing information related to whether a measurement performed by the UE is limited by an SNR of the first set of RS or a bandwidth of the first set of RS.

At 730, the method 700 determines (e.g., selects or calculates) a second set of RS transmission parameters using the report received at 720, wherein the second set of RS transmission parameters is different from the first set of RS transmission parameters. The determining at 730 may be performed by, for example, the processing system 375 depicted in FIG. 3. Accordingly, the processing system 375 may constitute means for determining a second set of RS transmission parameters using the received report, wherein the second set of RS transmission parameters is different from the first set of RS transmission parameters.

At 740, the method 700 transmits a second set of RS to the UE in accordance with the second set of RS transmission parameters determined at 730, or provides the second set of RS transmission parameters to a base station for the base station to transmit a second set of RS to the UE in accordance with the second set of RS transmission parameters. The transmitting or providing of the second set of RS transmission parameters may be performed by, for example, the TX processor 316 and/or one or more of the transmitters 318a depicted in FIG. 3. Accordingly, the TX processor 316 and/or one or more of the transmitters 318a may constitute means for transmitting the second set of RS to the UE in accordance with a second set of RS transmission parameters, or providing the second set of RS transmission parameters to the base station.

Figure 8:
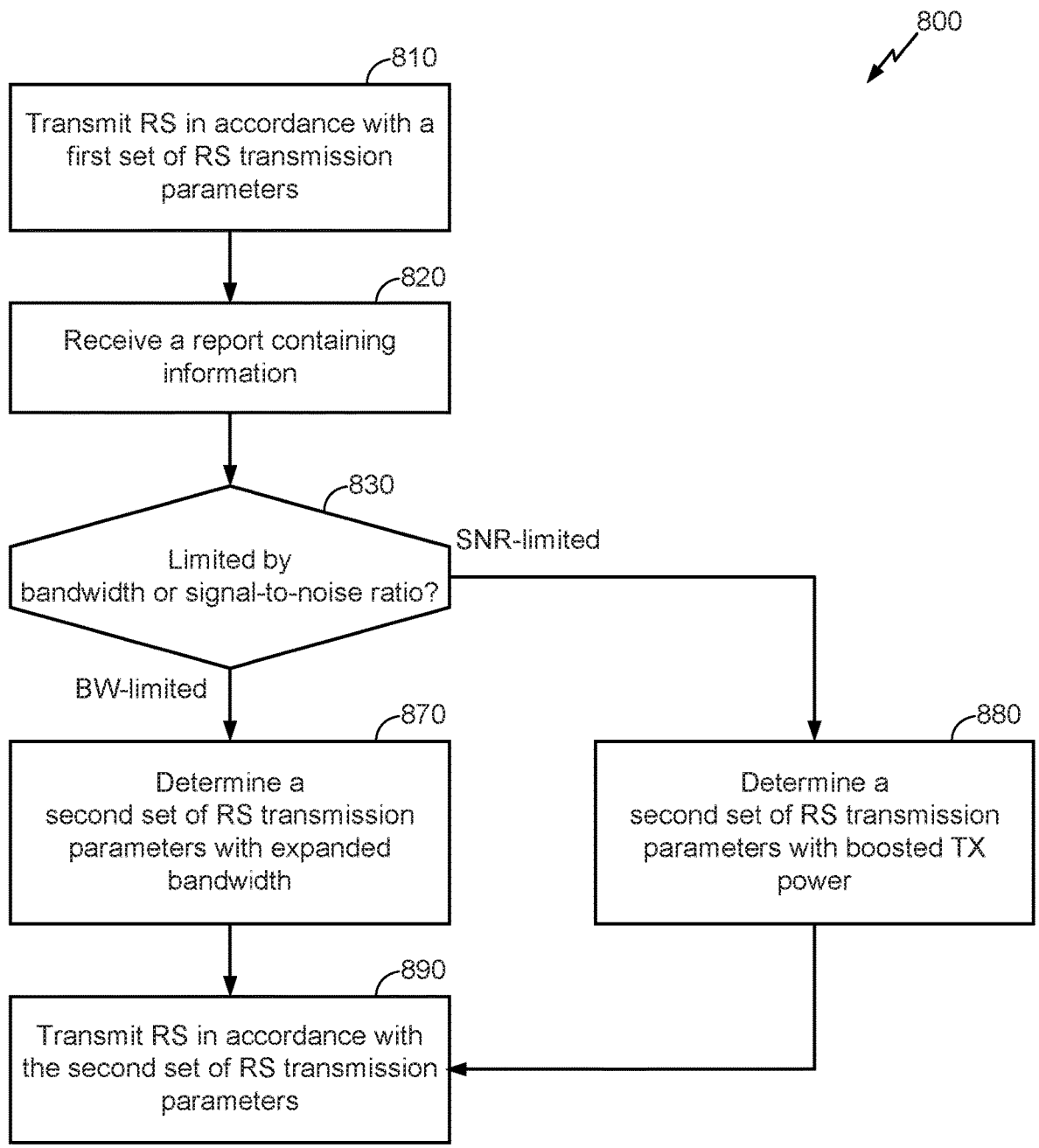
FIG. 8 illustrates another exemplary method according to various aspects of the disclosure.

FIG. 8 illustrates an exemplary method 800 according to various aspects. The method 800 depicted in FIG. 8 may be performed by, for example, any of the base stations described above, such as the BS 310 depicted in FIG. 3, one or more of the components that make up the BS 310, and/or the BS 410 depicted in FIG. 4. Additionally or alternatively, the method 800 depicted in FIG. 8 may be performed by, for example, a network node. However, the method 800 will be described as it would be performed by the BS 310 and the various components thereof.

At 810, the method 800 transmits a first set of RS in accordance with a first set of RS transmission parameters. The first set of RS transmission parameters may include a first bandwidth parameter and/or a first power parameter. The transmitting may be performed by, for example, the TX processor 316 and/or one or more of the transmitters 318a depicted in FIG. 3. Accordingly, the TX processor 316 and/or one or more of the transmitters 318a may constitute means for transmitting RS in accordance with a first set of RS transmission parameters.

At 820, the method 800 receives a report containing information. The report may be received from the UE (e.g., the UE 350 and/or the UE 420) and may be generated by the UE. The report may include one or more requests and/or data relating to one or more measurement performed at the UE. The receiving may be performed by, for example, the RX processor 370 and/or one or more of the receivers 318b depicted in FIG. 3. Accordingly, the RX processor 370 and/or one or more of the receivers 318b may constitute means for receiving a report from a UE.

At 830, the method 800 determines whether the accuracy of measurements performed by the UE is limited by BW or SNR. The determining may be performed by, for example, the processing system 375 depicted in FIG. 3. Accordingly, the processing system 375 may constitute means for determining whether the accuracy of measurements performed by the UE is limited by BW or SNR. If the method 800 determines that the accuracy of measurements performed by the UE are limited by BW ('BW-limited' at 830), then the method 800 may proceed to 870. By contrast, if the method 800 determines that the accuracy of measurements performed by the UE is limited by SNR ('SNR-limited' at 830), then the method 800 may proceed to 880.

The determining at 830 may be based at least in part on information encoded in or derived from the report received at 820. The report received at 820 may include any information suitable for facilitating the determining at 830. For example, the report received at 820 may include an SNR value associated with an SNR measurement performed by the UE on the first set of RS. Additionally or alternatively, the report received at 820 may include a channel quality indicator (CQI) associated with a measurement by the UE of a channel quality associated with the first set of RS. The BS 410 may be configured to estimate a measurement by the UE of the SNR associated with the first set of RS based on the CQI. Additionally or alternatively, the report received at 820 may include a request that the power parameter be increased or that the bandwidth parameter be increased. Additionally or alternatively, the report received at 820 may include a flag indicating whether the measurement performed by the UE is limited by the SNR of the first set of RS or the bandwidth of the first set of RS.

At 870, the method 800 determines (e.g., selects or calculates) a second set of RS transmission parameters with expanded BW. For example, the BW may be increased from a first bandwidth parameter value to a second bandwidth parameter value greater than the first bandwidth parameter value (e.g., doubled from 50 MHz to 100 MHz, 100 MHz to 200 MHz, etc.). The determining may be performed by, for example, the processing system 375 depicted in FIG. 3. Accordingly, the processing system 375 may constitute means for determining a second set of RS transmission parameters with expanded BW.

At 880, the method 800 determines (e.g., selects or calculates) a second set of RS transmission parameters with boosted TP. For example, the TP may be increased from a first power parameter value to a second power parameter value greater than the first power parameter value. The determining may be performed by, for example, the processing system 375 depicted in FIG. 3. Accordingly, the processing system 375 may constitute means for determining a second set of RS transmission parameters with boosted TP.

At 890, the method 800 transmits a second set of RS in accordance with the second set of RS transmission parameters determined at 870 or 880. The second set of RS transmission parameters may include a second bandwidth parameter and/or a second power parameter. The transmitting may be performed by, for example, the TX processor 316 and/or one or more of the transmitters 318a depicted in FIG. 3. Accordingly, the TX processor 316 and/or one or more of the transmitters 318a may constitute means for transmitting RS in accordance with a second set of RS transmission parameters.

In a variation of the method 800 not shown in FIG. 8, the method 800 may be performed by a network node distinct from the BS 410. However, rather than transmitting the first set of RS at 810 in accordance with the first set of RS transmission parameters, the network node may provide an instruction to the BS 410. The instruction may instruct the BS 410 to transmit a first set of RS in accordance with the first set of RS transmission parameters. Similarly, rather than transmitting the second set of RS at 890 in accordance with the second set of RS transmission parameters, the network node may provide an instruction to the BS 410. The instruction may instruct the BS 410 to transmit a second set of RS in accordance with the second set of RS transmission parameters. The remaining aspects of the method 800 may be performed in an analogous manner by the network node.

Figure 9:
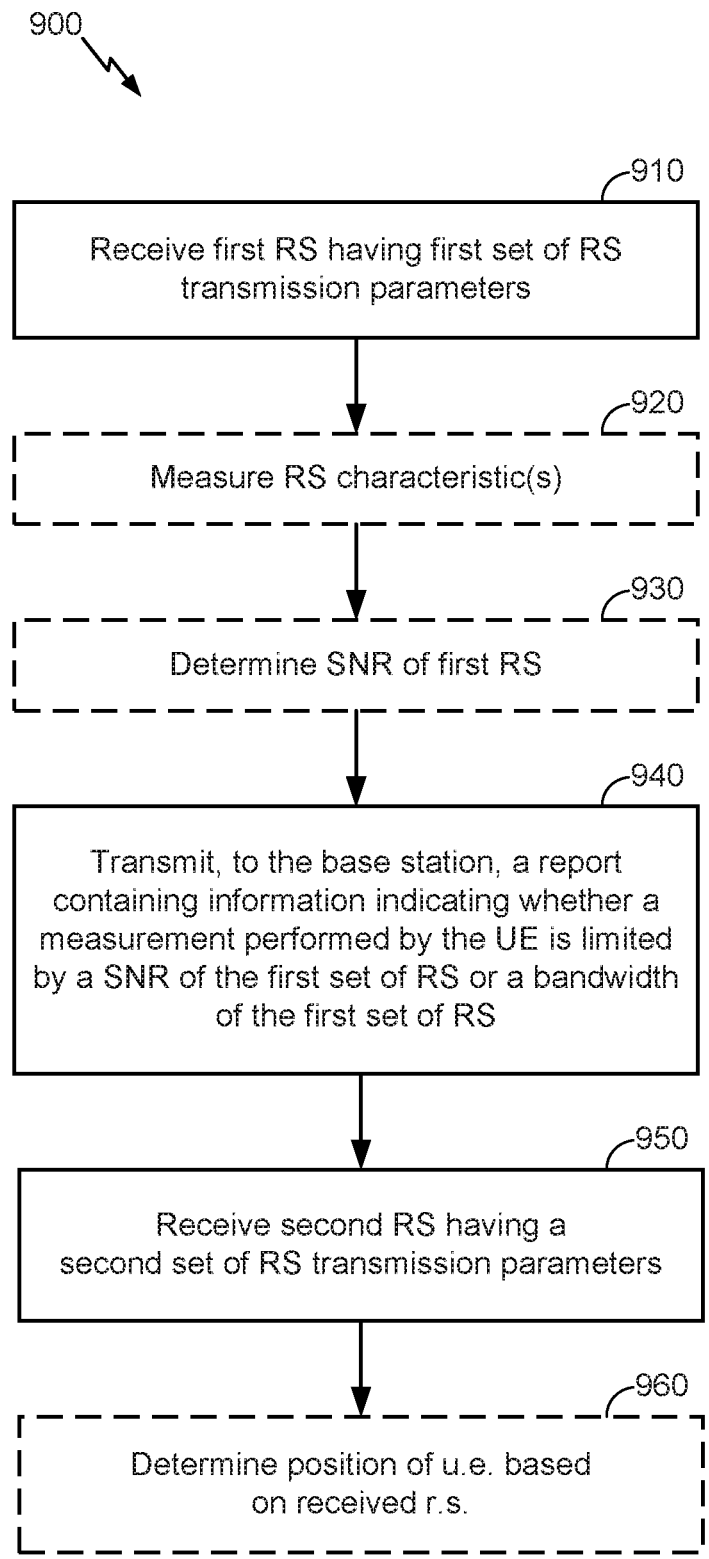
FIG. 9 illustrates yet another exemplary method according to various aspects of the disclosure.

FIG. 9 illustrates an exemplary method 900 according to various aspects of the disclosure. The method 900 depicted in FIG. 9 may be performed by, for example, any of the UEs described above, such as the UE 350 depicted in FIG. 3, one or more of the components that make up the UE 350, and/or the UE 420 depicted in FIG. 4.

At 910, the method 900 receives a first set of RS having a first set of RS transmission parameters. The receiving at 910 may be performed by, for example, the RX processor 356 and/or one or more of the receivers 354a depicted in FIG. 3. Accordingly, the RX processor 356 and/or one or more of the receivers 354a may constitute means for receiving a first set of RS having a first set of RS transmission parameters.

At 920, the method 900 optionally measures a characteristic of the R.S. received at 910. The measuring at 920 may be performed by, for example, the processing system 359, the RX processor 356 and/or one or more of the receivers 354a depicted in FIG. 3. Accordingly, the RX processor 356 and/or one or more of the receivers 354a may constitute means for receiving an RS associated with a first set of RS transmission parameters.

The measuring at 920 may be performed in any suitable manner. The characteristic may be a received signal power, a received noise power, a CQI, or any other measurement that cannot be directly performed by the BS 410. The measurement may provide sufficient information for the BS 410 and/or the UE 420 to determine an SNR experienced by the UE 420. The results of the measuring at 920 may be provided in a report to the BS 410 and may suffice to inform the BS 410 as to whether the UE 420 is BW-limited or SNR-limited, in which case the optional determining at 930 is skipped. Alternatively, the UE 420 may determine on its own at 930 whether the UE 420 is BW-limited or SNR-limited.

At 930, the method 900 optionally determines an SNR of the first RS received at 910. The determining at 920 may be performed by, for example, the processing system 359, the RX processor 356 and/or one or more of the receivers 354a. Accordingly, the processing system 359, the RX processor 356 and/or one or more of the receivers 354a may constitute means for determining an SNR of an RS.

As noted above, the UE 420 may optionally determine on its own whether the UE 420 is BW-limited or SNR-limited. The optional determining at 930 may be performed in any suitable manner. For example, the UE 420 may measure the received signal power and the received noise power, calculate the SNR based on the measured values, and determine if the UE 420 is BW-limited or SNR-limited based on the calculated SNR. Additionally or alternatively, the UE 420 may measure the CQI, calculate the SNR based on the measured CQI value, and determine if the UE 420 is BW-limited or SNR-limited based on the calculated SNR.

At 940, the method 900 transmits, to the BS 410, a report containing information indicating whether a measurement performed by the UE is limited by: an SNR of the first set of RS; or a bandwidth of the first set of RS. The transmitting at 940 may be performed by, for example, the TX processor 368 and/or one or more of the transmitters 354b depicted in FIG. 3. Accordingly, the TX processor 368 and/or one or more of the transmitters 354b may constitute means for transmitting a report to the BS 410.

The report may be generated in any suitable manner. As noted above, the information encoded in the report may suffice to inform the BS 410 as to whether the UE 420 is BW-limited or SNR-limited. For example, the UE 420 may calculate the SNR based on the received signal power and the received noise power and encode the resulting SNR value in the report transmitted at 940. Additionally or alternatively, the UE 420 may encode a CQI value in the report transmitted at 940. Additionally or alternatively, the UE 420 may determine the SNR in accordance with any suitable method, determine whether the UE 420 is BW-limited or SNR-limited in accordance with any suitable method, and encode in the report a request that the bandwidth parameter be increased (in the event that the UE 420 is BW-limited) or that the power parameter be increased (in the event that the UE 420 is SNR-limited). Additionally or alternatively, the UE 420 may determine the SNR in accordance with any suitable method, determine whether the UE 420 is BW-limited or SNR-limited in accordance with any suitable method, and encode in the report a flag indicating whether the measurement is BW-limited or SNR-limited.

At 950, the method 900 receives a second RS associated with a second set of RS transmission parameters. The receiving at 950 may be performed by, for example, the RX processor 356 and/or one or more of the receivers 354a depicted in FIG. 3. Accordingly, the RX processor 356 and/or one or more of the receivers 354a may constitute means for receiving a second RS associated with a second set of RS transmission parameters.

At 960, the method 900 optionally determines a position of the UE 420 based on the RS received at 950. The determining may be performed by, for example, the processing system 359 depicted in FIG. 3. Accordingly, the processing system 359 may constitute means for determining a position of a UE based on a received RS.

Figure 10:
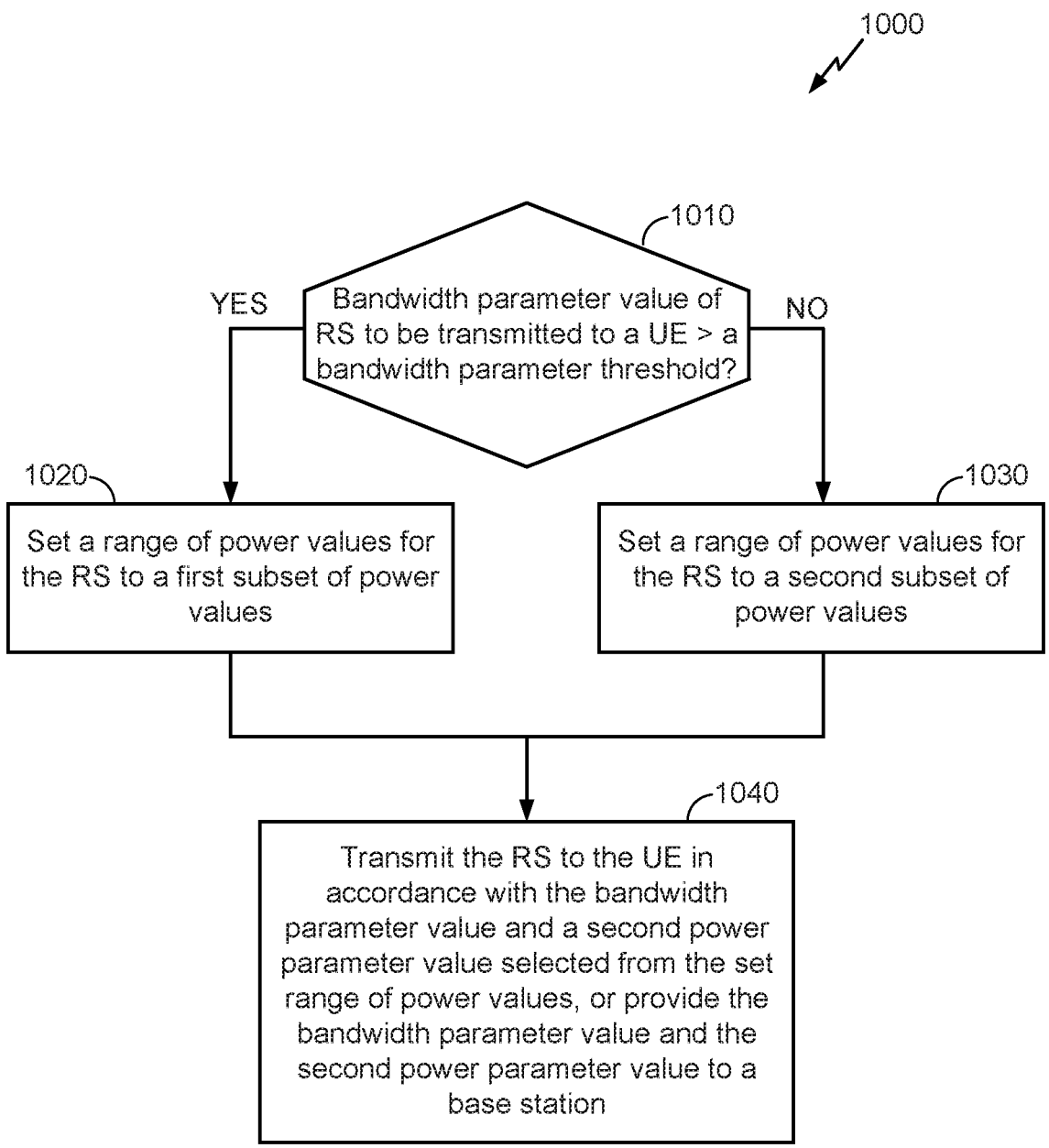
FIG. 10 illustrates yet another exemplary method according to various aspects of the disclosure.

FIG. 10 illustrates an exemplary method 1000 for transmission of RS, according to various aspects. The method 1000 depicted in FIG. 10 may be performed by, for example, any of the base stations described above, such as the BS 310 depicted in FIG. 3, one or more of the components that make up the BS 310, and/or the BS 410 depicted in FIG. 4. Additionally or alternatively, the method 1000 depicted in FIG. 10 may be performed by, for example, a network node. However, the method 1000 will be described as it would be performed by the BS 310 depicted in FIG. 3.

At 1010, the method 1000 compares the transmission bandwidth value of RS to be transmitted to a UE to a bandwidth threshold. The comparing may be performed by, for example, the processing system 375 depicted in FIG. 3. Accordingly, the processing system 375 may constitute means for comparing the transmission bandwidth to a bandwidth threshold.

If the method 1000 determines that the transmission bandwidth value is above a bandwidth threshold ('yes' at 1020), then the method 1000 may proceed to 1020. By contrast, if the method 1000 determines that the transmission bandwidth is not above the bandwidth threshold ('no' at 1020), then the method 1000 may proceed to 1030.

The bandwidth parameter threshold may be any suitable value. For example, the bandwidth parameter threshold may be equal to a bandwidth parameter threshold indication provided in association with an RRC protocol or other higher layer positioning protocol. Additionally or alternatively, the bandwidth parameter threshold may be equal to an active bandwidth part (BWP) associated with the UE. Additionally or alternatively, the bandwidth parameter threshold may be equal to a maximum bandwidth associated with the UE, as determined by a UE capability report.

At 1020, the method 1000 sets a range of power values to a first subset of power values in response to a determination that the bandwidth parameter value is greater than the bandwidth parameter threshold. The setting may be performed by, for example, the processing system 375 depicted in FIG. 3. Accordingly, the processing system 375 may constitute means for setting a range of power values to a first subset of power values in response to a determination that the bandwidth parameter value is greater than a bandwidth parameter threshold.

At 1030, the method 1000 sets the range of power values to a second subset of power values in response to a determination that the bandwidth parameter value is less than the bandwidth parameter threshold. The setting may be performed by, for example, the processing system 375 depicted in FIG. 3. Accordingly, the processing system 375 may constitute means for setting the range of power values to a second subset of power values in response to a determination that the bandwidth parameter value is less than the bandwidth parameter threshold.

As will be discussed in greater detail below, the setting of the range of power values at 1020 or 1030 may be performed in accordance with the chart depicted in FIG. 11. The range of power values set at 1020 or 1030 may specify a maximum power value. For example, the first subset of power values may specify a first maximum power value and the second subset of power values may specify a second maximum power value. In some implementations, the second maximum power value may be greater than the first maximum power value. Accordingly, if the bandwidth is above the threshold, the maximum power value may be lower than it otherwise would be.

At 1040, the method 1000 transmits the RS to the UE in accordance with the bandwidth parameter value and a second power parameter value selected from the set range of power values, or provides the bandwidth parameter value and the second power parameter value to a base station for the base station to transmit the RS to the UE in accordance with the bandwidth parameter value and the second power parameter value. The transmitting/providing at 1050 may be performed by, for example, the TX processor 316 and/or one or more of the transmitters 318a depicted in FIG. 3. Accordingly, the TX processor 316 and/or one or more of the transmitters 318a may constitute means for transmitting the RS to the UE in accordance with the bandwidth parameter value and the second power parameter value selected from the set range of power values, or providing the bandwidth parameter value and the second power parameter value to the base station.

In a variation of the method 1000 not shown in FIG. 10, the method 1000 may be performed by a network node distinct from the BS 410. However, rather than comparing the transmission bandwidth value of RS to be transmitted to a UE to a bandwidth threshold, the network node may provide an instruction to the BS 410. The instruction may instruct the BS 410 to compares the transmission bandwidth value of RS to be transmitted to a UE to a bandwidth threshold. Similarly, rather than transmitting the RS at 1040, the network node may provide an instruction to the BS 410. The instruction may instruct the BS 410 to transmit the RS to the UE in accordance with the bandwidth parameter value and the second power parameter value selected from the set range of power values. The remaining aspects of the method 1000 may be performed in an analogous manner by the network node.

Figure 11:
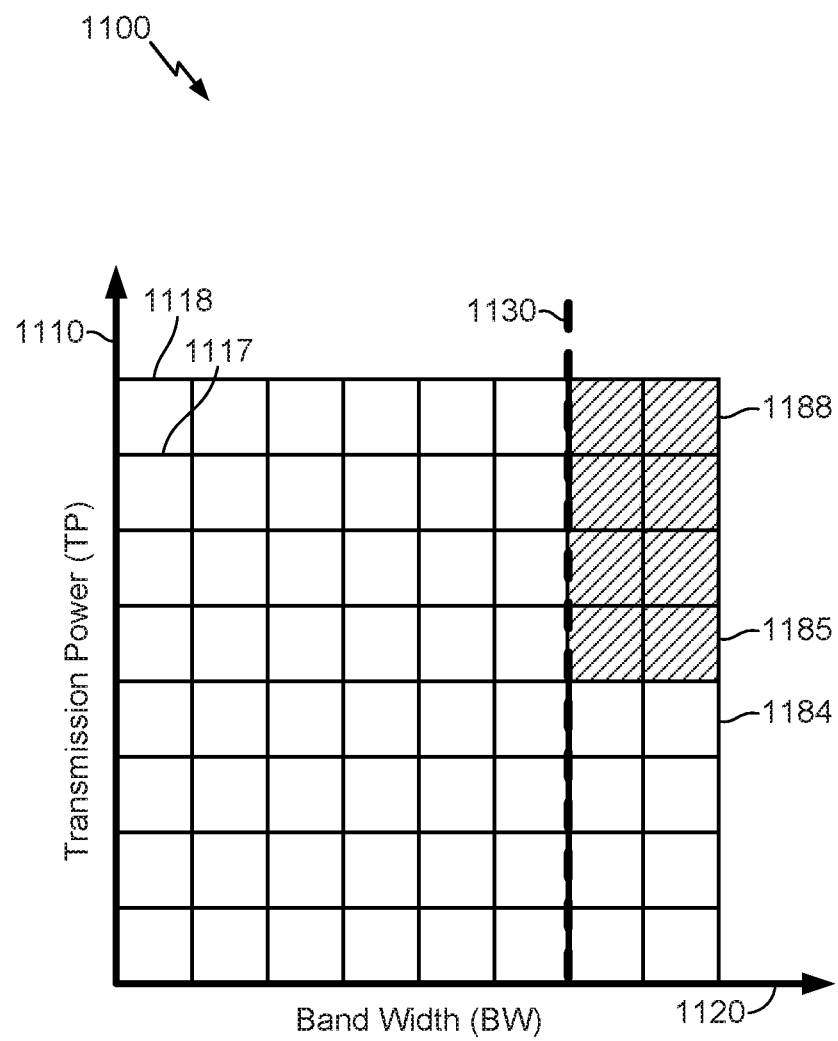
FIG. 11 illustrates a map of bandwidth and transmission power combinations, according to aspects of the disclosure.

FIG. 11 illustrates a chart 1100 of available combinations of BW and TP, according to aspects of the disclosure. The chart 1100 includes a y-axis corresponding to a transmission power 1110 and a y-axis corresponding to a bandwidth 1120. Each block in the chart may represent a discrete combination of BW and TP. In the present example, there are eight possible BWs and eight possible TPs. Accordingly, in the present example, there are sixty-four possible combinations of BW and TP. Although the blocks correspond to discrete combinations, it will be understood that the transmission power 1110 and the bandwidth 1120 correspond to continuums, and that there may be any number of BW/TP combinations.

For clarity, several examples of combination block are particularly pointed out with reference numerals. For brevity, the remainder are unreferenced. In this example, a BW/TP combination 1117 and a BW/TP combination 1118 (corresponding to the first discrete increment of BW and the seventh and eighth discrete increments of TP, respectively) are available to the BS 410. By contrast, the BS 410 is restricted from a BW/TP combination 1185 and a BW/TP combination 1188 (corresponding to the eighth discrete increment of BW and the fourth and fifth discrete increments of TP, respectively). If a block is restricted, then the BS 410 cannot, for whatever reason, transmit with that particular BW/TP combination. One possible reason for restricting a particular combination block may be a determination by the BS 410 or a related network node that this particular combination block would cause excessive interference. Additionally or alternatively, the BS 410 may be configured with explicit restrictions relating to applicable wireless standards.

The chart 1100 also includes a bandwidth threshold 1130. The bandwidth threshold 1130 may be the same threshold described above with respect to FIG. 10 (block 1010 in particular). It will be understood that if the bandwidth 1120 exceeds the bandwidth threshold 1130, then the TP may be limited. For example, the BS 410 may be limited to a BW/TP combination 1184 (corresponding to the eighth discrete increment of BW and the fourth discrete increments of TP), due to the restricted BW/TP combinations beyond the bandwidth threshold 1130 and above the BW/TP combination 1184.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (for example, a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a compact disk (CD), laser disc, optical disk, digital video disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for transmitting reference signals (RS) for positioning, comprising:
   transmitting or providing an instruction to transmit a first set of RS to a user equipment (UE) in accordance with a first set of RS transmission parameters;
   receiving a report containing information indicating whether a measurement performed by the UE is limited by:
      a signal-to-noise ratio (SNR) of the first set of RS being below an SNR threshold such that the UE is unable to accurately measure the first set of RS; or
      a bandwidth of the first set of RS being below a bandwidth threshold such that the UE is unable to accurately measure the first set of RS;
   determining a second set of RS transmission parameters based on the received report, wherein the second set of RS transmission parameters is different from the first set of RS transmission parameters; and
   transmitting a second set of RS to the UE in accordance with the second set of RS transmission parameters, or providing the second set of RS transmission parameters to a base station.

2. The method of claim 1, wherein the first set of RS transmission parameters includes:
   a bandwidth parameter associated with the transmitting of the first set of RS; and/or
   a power parameter associated with the transmitting of the first set of RS, and wherein the second set of RS transmission parameters each includes:
   a bandwidth parameter associated with the transmitting of the second set of RS; and/or
   a power parameter associated with the transmitting of the second set of RS.

3. The method of claim 2, wherein:
   the first set of RS transmission parameters includes a first bandwidth parameter value;
   the information indicates that the measurement performed by the UE is limited by the bandwidth of the first set of RS; and
   the determining of the second set of RS transmission parameters comprises determining a second bandwidth parameter value, wherein the second bandwidth parameter value is greater than the first bandwidth parameter value.

4. The method of claim 2, wherein:
   the first set of RS transmission parameters includes a first power parameter value;

the information indicates that the measurement performed by the UE is limited by the SNR of the first set of RS; and the determining of the second set of RS transmission parameters comprises determining a second power parameter value, wherein the second power parameter value is greater than the first power parameter value.

5. The method of claim 1, wherein the information comprises an SNR value associated with a measurement by the UE of the SNR associated with the first set of RS.

6. The method of claim 1, wherein the information comprises a channel quality indicator (CQI) associated with a measurement by the UE of a channel quality associated with the first set of RS.

7. The method of claim 6, further comprising:
estimating a measurement of the SNR associated with the first set of RS based on the CQI.

8. The method of claim 1, wherein the report includes a request that the power parameter be increased, that the bandwidth parameter be increased, or both.

9. The method of claim 1, wherein the information comprises a flag indicating whether the measurement performed by the UE is limited by the SNR of the first set of RS or the bandwidth of the first set of RS.

10. The method of claim 1, wherein the method is performed by:
the base station, the method further comprising transmitting the first set of RS and the second set of RS; or
a network node, the method further comprising providing the base station with the instruction to transmit the first set of RS.

11. A method for receiving reference signals (RS) for positioning, comprising:
receiving, from a base station and at a user equipment (UE), a first set of RS having a first set of RS transmission parameters;
transmitting to the base station a report containing information indicating whether a measurement performed by the UE is limited by:
a signal-to-noise ratio (SNR) of the first set of RS being below an SNR threshold such that the UE is unable to accurately measure the first set of RS; or
a bandwidth of the first set of RS being below a bandwidth threshold such that the UE is unable to accurately measure the first set of RS; and
receiving, from the base station and at the UE, a second set of RS having a second set of RS transmission parameters.

12. The method of claim 11, wherein the first set of RS transmission parameters and the second set of RS transmission parameters each include:
a bandwidth parameter associated with the transmitting of the first set of RS and the transmitting of the second set of RS; and/or
a power parameter associated with the transmitting of the first set of RS and the transmitting of the second set of RS.

13. The method of claim 12, wherein:
the first set of RS transmission parameters includes a first bandwidth parameter value;
the information indicates that the measurement performed by the UE is limited by the bandwidth of the first set of RS; and
the second set of RS transmission parameters is associated with a second bandwidth parameter value, wherein the second bandwidth parameter value is greater than the first bandwidth parameter value.

14. The method of claim 12, wherein:
the first set of RS transmission parameters includes a first power parameter value;
the information indicates that the measurement performed by the UE is limited by the SNR of the first set of RS; and
the second set of RS transmission parameters is associated with a second power parameter value, wherein the second power parameter value is greater than the first power parameter value.

15. The method of claim 11, further comprising measuring an SNR value associated with the receiving of the first set of RS, wherein the information comprises the measured SNR value.

16. The method of claim 11, further comprising measuring a channel quality indicator (CQI) associated with the receiving of the first set of RS, wherein the information comprises the measured CQI.

17. The method of claim 11, further comprising:
measuring a CQI associated with the receiving of the first set of RS; and
estimating a measurement of the SNR associated with the first set of RS based on the measured CQI;
wherein the information comprises the estimated SNR.

18. The method of claim 11, wherein the report includes a request that the power parameter be increased or that the bandwidth parameter be increased.

19. The method of claim 11, wherein the information comprises a flag indicating whether the measurement performed by the UE is limited by the SNR of the first set of RS or the bandwidth of the first set of RS.

20. An apparatus, comprising:
at least one transceiver;
a memory system that stores data and/or instructions; and
a processing system, coupled to the memory and the at least one transceiver,
wherein one or more of the at least one transceiver, the memory system, and the processing system cause the apparatus to:
receive, from a base station and at a user equipment (UE), a first set of reference signals (RS) having a first set of RS transmission parameters;
transmit to the base station a report containing information related to whether a measurement performed by the UE is limited by:
a signal-to-noise ratio (SNR) of the first set of RS being below an SNR threshold such that the UE is unable to accurately measure the first set of RS; or
a bandwidth of the first set of RS being below a bandwidth threshold such that the UE is unable to accurately measure the first set of RS; and
receive, from a base station and at the UE, a second set of RS having a second set of RS transmission parameters.

21. The apparatus of claim 20, wherein the first set of RS transmission parameters and the second set of RS transmission parameters each include:
a bandwidth parameter associated with transmission of the first set of RS and transmission of the second set of RS; and/or
a power parameter associated with transmission of the first set of RS and transmission of the second set of RS.

22. The apparatus of claim 21, wherein:
the first set of RS transmission parameters includes a first bandwidth parameter value;

the information indicates that the measurement performed by the UE is limited by the bandwidth of the first set of RS; and the second set of RS transmission parameters is associated with a second bandwidth parameter value, wherein the second bandwidth parameter value is greater than the first bandwidth parameter value.

23. The apparatus of claim 21, wherein:

the first set of RS transmission parameters includes a first power parameter value;

the information indicates that the measurement performed by the UE is limited by the SNR of the first set of RS; and the second set of RS transmission parameters is associated with a second power parameter value, wherein the second power parameter value is greater than the first power parameter value.

24. The apparatus of claim 20, wherein the report includes a flag indicating whether the measurement performed by the UE is limited by the SNR of the first set of RS or the bandwidth of the first set of RS.

\* \* \* \* \*